United States Patent
Chen et al.

(10) Patent No.: US 11,206,451 B2
(45) Date of Patent: *Dec. 21, 2021

(54) INFORMATION INTERCEPTION PROCESSING METHOD, TERMINAL, AND COMPUTER STORAGE MEDIUM

(71) Applicant: Tencent Technology (Shenzhen) Company Limited, Guangdong (CN)

(72) Inventors: Meng Chen, Shenzhen (CN); Jingjing Hu, Shenzhen (CN); Hui Liu, Shenzhen (CN); Fengfeng Zhang, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 101 days.

This patent is subject to a terminal disclaimer.

(21) Appl. No.: 16/725,839

(22) Filed: Dec. 23, 2019

(65) Prior Publication Data

US 2020/0137451 A1 Apr. 30, 2020

Related U.S. Application Data

(63) Continuation of application No. 15/707,414, filed on Sep. 18, 2017, now Pat. No. 10,567,841, which is a (Continued)

(30) Foreign Application Priority Data

Dec. 30, 2015 (CN) .......................... 201511025764.7

(51) Int. Cl.
*G06F 15/173* (2006.01)
*H04N 21/454* (2011.01)
(Continued)

(52) U.S. Cl.
CPC ..... *H04N 21/454* (2013.01); *H04L 29/08747* (2013.01); *H04L 29/12* (2013.01);
(Continued)

(58) Field of Classification Search
CPC ............... H04N 21/454; H04N 21/812; H04N 21/8173; H04N 29/08747; H04N 29/12; H04W 12/10
(Continued)

(56) References Cited

U.S. PATENT DOCUMENTS 5,802,304 A 9/1998 Stone
6,675,229 B1 1/2004 Bruno et al.
(Continued)

FOREIGN PATENT DOCUMENTS

CN 101620529 A 1/2010
CN 103150513 A 6/2013
(Continued)

OTHER PUBLICATIONS

International Search Report and Written Opinion dated Jul. 21, 2016 for PCT Application No. PCT/CN2016/081742, 13 pages.
(Continued)

*Primary Examiner* — Imad Hussain
(74) *Attorney, Agent, or Firm* — Crowell & Moring LLP

(57) ABSTRACT

An information interception method, a terminal, and a computer storage medium are disclosed. The method includes: starting a first application, extracting an application list of applications that need to be intercepted, and separately configuring an interception policy for each to-be-intercepted application in the application list; obtaining a network request sent by a to-be-intercepted application, and monitoring, when the first application enters an interception mode, according to the configured interception policy, the network request sent by the to-be-intercepted application, to
(Continued)

obtain, through matching, communication information that conforms to the interception policy, where the communication information is associated with the network request; and matching the communication information with a preset policy, when the communication information is specified target information corresponding to the preset policy, intercepting the network request and locating and tracing the to-be-intercepted application that sends the network request.

18 Claims, 12 Drawing Sheets

Related U.S. Application Data continuation of application No. PCT/CN2016/081742, filed on May 11, 2016.

(51) Int. Cl.
*H04N 21/81* (2011.01)
*H04L 29/08* (2006.01)
*H04L 29/12* (2006.01)
*H04W 12/10* (2021.01)

(52) U.S. Cl.
CPC ....... *H04N 21/812* (2013.01); *H04N 21/8173* (2013.01); *H04W 12/10* (2013.01)

(58) Field of Classification Search
USPC ........................................................ 709/224
See application file for complete search history.

(56) References Cited

U.S. PATENT DOCUMENTS

| | | | |
|---|---|---|---|
| 9,116,717 B2 | 8/2015 | Soeder | |
| 10,567,841 B2 * | 2/2020 | Chen | ........................ H04L 29/12 |
| 2006/0156380 A1 | 7/2006 | Gladstone et al. | |
| 2006/0288096 A1 * | 12/2006 | Yim | ........................ H04L 43/18 |
| | | | 709/224 |
| 2008/0034419 A1 | 2/2008 | Mullick et al. | |
| 2012/0110173 A1 | 5/2012 | Luna et al. | |
| 2012/0278886 A1 | 11/2012 | Luna et al. | |
| 2013/0031191 A1 | 1/2013 | Bott | |
| 2013/0031599 A1 | 1/2013 | Luna et al. | |
| 2013/0110637 A1 | 5/2013 | Bott | |
| 2013/0205366 A1 | 8/2013 | Luna et al. | |
| 2014/0040979 A1 | 2/2014 | Barton et al. | |
| 2014/0258489 A1 | 9/2014 | Muppala et al. | |
| 2014/0380414 A1 | 12/2014 | Saidi et al. | |
| 2017/0339172 A1 * | 11/2017 | Mahadevia | ........ H04L 63/0263 |
| 2018/0046802 A1 | 2/2018 | Pyles et al. | |
| 2018/0278652 A1 | 9/2018 | Narayanaswamy et al. | |
| 2019/0306181 A1 | 10/2019 | Mahadevia et al. | |

FOREIGN PATENT DOCUMENTS

| | | |
|---|---|---|
| CN | 103530560 A | 1/2014 |
| CN | 104092792 A | 10/2014 |
| CN | 104123120 A | 10/2014 |
| CN | 104123276 A | 10/2014 |
| CN | 104468551 A | 3/2015 |
| CN | 104598815 A | 5/2015 |
| CN | 106936793 A | 7/2017 |

OTHER PUBLICATIONS

Office Action dated Jun. 4, 2019 for Chinese Application No. 201511025764.7 with concise English Translation, 9 pages.

\* cited by examiner

INFORMATION INTERCEPTION PROCESSING METHOD, TERMINAL, AND COMPUTER STORAGE MEDIUM

RELATED APPLICATION

This application is a continuation of U.S. application Ser. No. 15/707,414 filed on Sep. 18, 2017, which is a continuation application of PCT Patent Application No. PCT/CN2016/081742, filed on May 11, 2016, which claims priority to Chinese Patent Application No. 201511025764.7, filed with the Chinese Patent Office on Dec. 30, 2015, all of which are incorporated herein by reference in their entireties.

FIELD OF THE TECHNOLOGY

The present disclosure relates to interception technologies, and in particular, to an information interception processing method, a terminal, and a computer storage medium.

BACKGROUND OF THE DISCLOSURE

The development of Internet technologies enables a large amount of information to be shared and broadcast. For example, when a user sees a piece of excellent news, the user may forward the news by using Weibo. This is a type of information sharing. For example, when a user watches a video, in addition to video programs that the user intends to watch, the user may further see some advertising recommendations, hot news, or headline news prompts inserted between the programs. This is also a type of information sharing. However, among a large amount of information, much information is invalid information that user does not need, or is information that user has no concern about. For example, when a user reads a book by using a reading application, the more information such as product advertising information or latest game information is pushed by the reading application, the more system resources of a terminal is occupied. When the terminal is in a network-connected state, the pushing of this type of information also generates a large amount of network traffic. Consequently, unnecessary communication costs occur for the user of the terminal.

For the foregoing type of information, information interception processing needs to be performed. However, for an active or passive information interception method used in the related technology, information cannot be effectively intercepted, information sources cannot be effectively located, and system resources of the terminal may still be occupied. As a result, unnecessary communication costs still occur for the user of the terminal. For this problem, there is no effective solution.

SUMMARY

In view of this, embodiments of the present disclosure provide an information interception processing method, a terminal, and a computer storage medium, so as to at least resolve the problem in the existing technology, effectively intercept information, locate information sources, and avoid occupation of system resources of a terminal, so that unnecessary communication costs do not need to be increased for a terminal user.

The technical solutions of the embodiments of the present disclosure are implemented as follows:

An embodiment of the present disclosure provides an information interception processing method, including:

starting, by a device comprising a memory and a processor in communication with the memory, a first application;

extracting, by the device, an application list of applications that need to be intercepted;

separately configuring, by the device, an interception policy for each respective to-be-intercepted application in the application list;

obtaining, by the device, a network request sent by a respective to-be-intercepted application; and when the first application enters an interception mode:
monitoring, by the device, according to an interception policy of the respective to-be-intercepted application, the network request sent by the respective to-be-intercepted application, obtaining, by the device, through matching, communication information that conforms to the interception policy, the communication information being associated with the network request, matching, by the device, the communication information with a preset policy, and when it is determined, through matching, that the communication information is specified target information corresponding to the preset policy:

intercepting, by the device, the network request, and locating and tracing, by the device, the respective to-be-intercepted application that sends the network request.

An embodiment of the present disclosure provides a terminal, including:

a memory storing instructions; and a processor in communication with the memory, wherein, when the processor executes the instructions, the processor is configured to cause the terminal to:

start a first application, extract an application list of applications that need to be intercepted, separately configure an interception policy for each respective to-be-intercepted application in the application list, obtain a network request sent by a respective to-be-intercepted application, when the first application enters an interception mode:
monitor, according to an interception policy of the respective to-be-intercepted application, the network request sent by the respective to-be-intercepted application, obtain, through matching, communication information that conforms to the interception policy, the communication information being associated with the network request, match the communication information with a preset policy, and when it is determined, through matching, that the communication information is specified target information corresponding to the preset policy:

intercept the network request, and locate and trace the respective to-be-intercepted application that sends the network request.

An embodiment of the present disclosure further provides a non-transitory computer readable storage medium storing instructions, the instructions, when executed by a processor, causing the processor to perform:

starting a first application;

extracting an application list of applications that need to be intercepted;

separately configuring an interception policy for each respective to-be-intercepted application in the application list;

obtaining a network request sent by a respective to-be-intercepted application; and when the first application enters an interception mode:

monitoring according to an interception policy of the respective to-be-intercepted application, the network request sent by the respective to-be-intercepted application, obtaining through matching, communication information that conforms to the interception policy, the communication information being associated with the network request, matching the communication information with a preset policy, and when it is determined, through matching, that the communication information is specified target information corresponding to the preset policy:

intercepting the network request, and locating and tracing the respective to-be-intercepted application that sends the network request.

The embodiments of the present disclosure provide an information interception processing method. The method includes: starting a first application, extracting an application list in which applications need to be intercepted, and separately configuring an interception policy for each to-be-intercepted application in the application list; obtaining a network request sent by a to-be-intercepted application, and listening to, when the first application enters an interception mode, according to the configured interception policy, the network request sent by the to-be-intercepted application, to obtain, through matching, communication information that conforms to the interception policy, where the communication information is associated with the network request; and matching the communication information with a preset policy, intercepting the network request if determining, through matching, that the communication information is specified target information, and locating and tracing the to-be-intercepted application that sends the network request.

By using the embodiments of the present disclosure, an interception policy may be separately configured for at least one to-be-intercepted application except the first application. Because the interception policy may be separately set for a single application, the interception is more targeted, so that the efficiency/rate of the information interception is faster and the precision of the information interception is higher. After an interception mode is entered, after a network request is detected, if communication information associated with the network request is matched with a preset policy to obtain specified target information, the network request may be intercepted, and a to-be-intercepted application that sends the network request may be located and traced. Because information can be intercepted, and the to-be-intercepted application that sends the network request can be located, the efficiency/rate of the information interception is faster and the precision of the information interception is higher. Further, a user may be prompted to know that a security risk exists in the to-be-intercepted application, so that the security is improved.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may derive other drawings from these accompanying drawings.

DESCRIPTION OF EMBODIMENTS

The following further describes the implementations of the technical solutions in detail with reference to the accompanying drawings.

Figure 1:
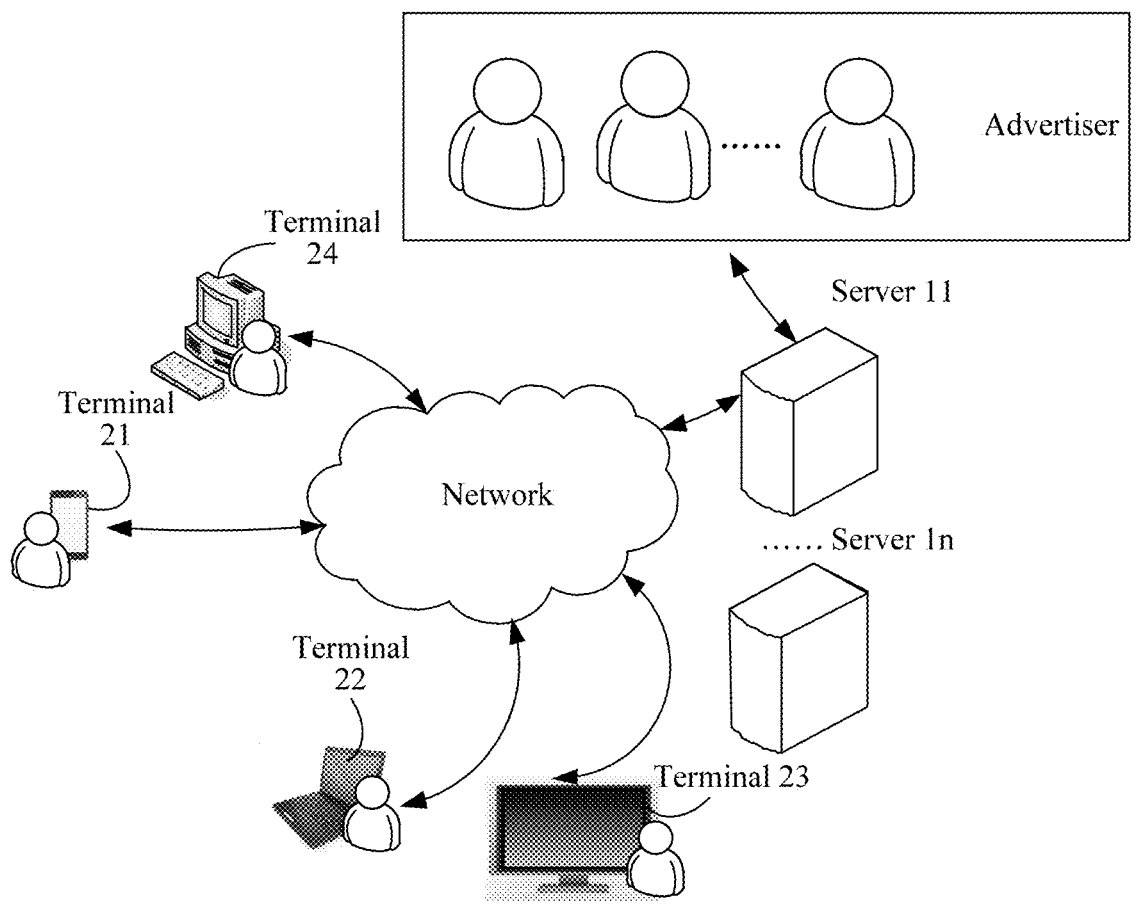
FIG. 1 is a schematic diagram of hardware entities of all parties that perform information interactions according to embodiments of the present disclosure.

FIG. 1 is a schematic diagram of hardware entities of all parties that perform information interactions according to the embodiments of the present disclosure. FIG. 1 includes: servers 11 . . . 1n and terminal devices 21 to 24. The terminal devices 21 to 24 perform information interactions with the servers by using a wired network or a wireless network. The terminal devices may include a mobile phone, a desktop, a PC, an all-in-one machine, or another type. In an example, the servers 11 . . . 1n may further interact with a first type of terminals (for example, terminals in which advertisers are located, or referred to as objects that provide advertising materials and content for promotion) by using a network. After the first type of terminals submit an advertisement that the first type of terminals intend to release, the advertisement is stored in a server cluster, and an administrator may be allocated to perform a series of processing such as auditing on the advertisement released by the first type of terminals. Related to the first type of terminals, the terminal devices 21 to 24 may be referred to as a second type of terminals (for example, terminals in which ordinary users are located, or referred to as objects displayed or exposed by advertising), and may be users who watch videos by using video applications, users who play games by using game applications, and the like. All applications or specified applications (for example, game applications, video applications, or navigation applications) installed in the terminal devices may be added with advertisements to display more recommendation information to users. By using the embodiments of the present disclosure, based on the system shown in FIG. 1, the embodiments of the present disclosure includes: starting a first application, extracting an application list in which applications need to be intercepted, and separately configuring an interception policy for each to-be-intercepted application in the application list; obtaining a network request sent by a to-be-intercepted application, and detecting whether to enter an interception mode of the first application currently, if it is to enter the interception mode of the first application, monitoring, according to the interception policy, the network request sent by the to-be-intercepted application, to obtain, through matching, communication information that conforms to the interception policy, where the communication information is associated with the network request; and matching the communication information with a preset policy, for example, an information multi-feature audit policy, and intercepting the network request if determining, through matching, that the communication information is specified target information, and locating and tracing the to-be-intercepted application that sends the network request.

The example in FIG. 1 is only a system architecture instance for implementing the embodiments of the present disclosure. The embodiments of the present disclosure are not limited to the system architecture in FIG. 1. The embodiments of the present disclosure are provided based on the system architecture.

Figure 2:
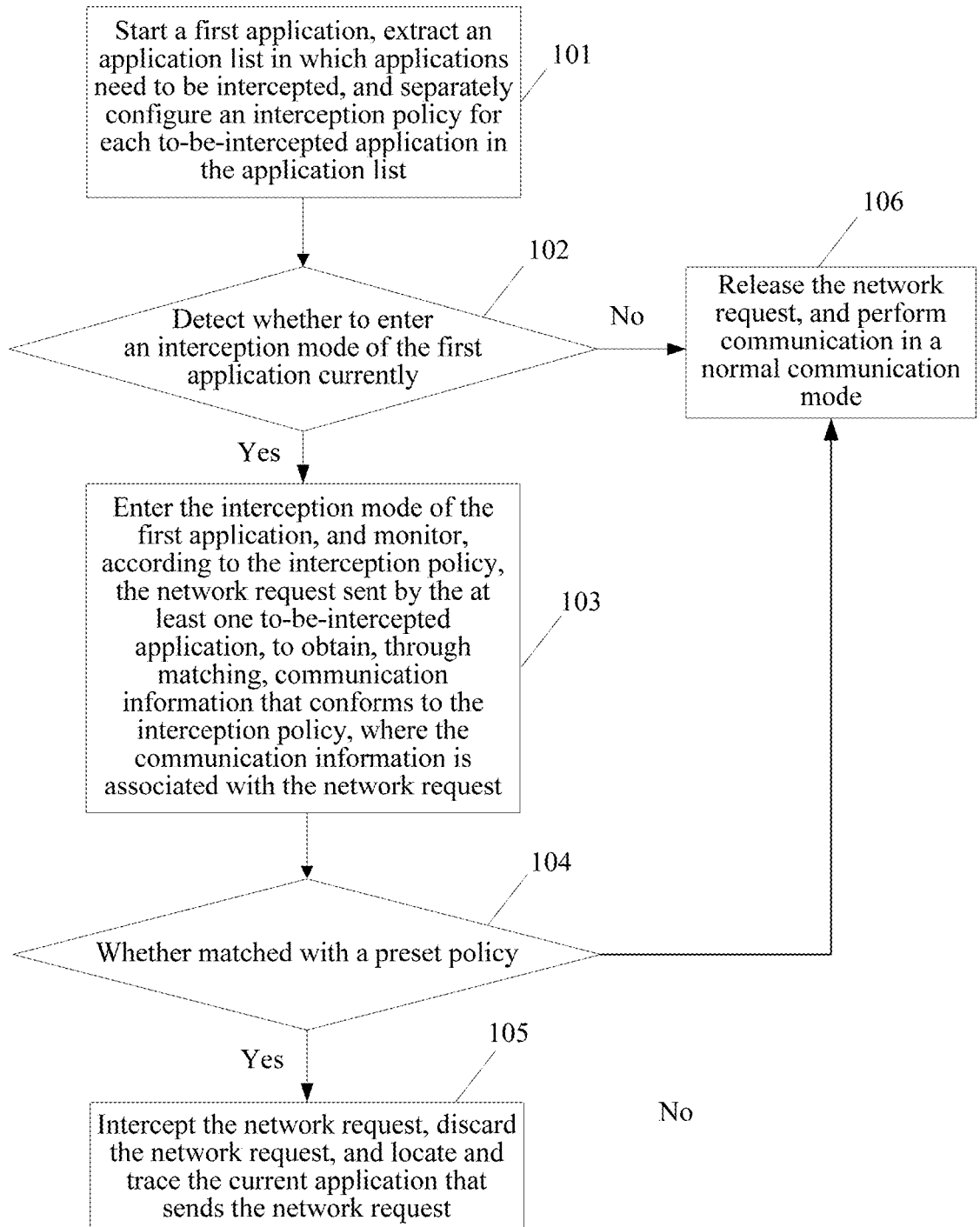
FIG. 2 is a schematic diagram of an implementation process according to some embodiments of the present disclosure.

This embodiment of the present disclosure provides an information interception method. As shown in FIG. 2, the method includes:

Step 101. Start a first application, extract an application list in which applications need to be intercepted, and separately configure an interception policy for each to-be-intercepted application in the application list.

Herein, terminals in this step refer to the second type of terminals mentioned in the foregoing overview. The second type of terminals may be terminals in which ordinary users are located, or referred to as objects displayed or exposed by advertising. The second type of terminals may comprise a memory storing instructions. The second type of terminal may also comprises a processor in communication with the memory and executing the instructions.

Herein, the first application serves as an application used for information interception, and may include but not limited to the Optimization Master, and the like. The at least one to-be-intercepted application except the first application may be a video application, a music playing application, a reading application, a browser application and the like that are installed in a terminal. If a network request is an advertising request, advertising information is intercepted by the application used for information interception. In a scenario of pushing a large amount of information to a user, much information is invalid information that user does not need, or is information that user has no concern about. For example, when the user reads a book by using a reading application, more information such as product advertising information or latest game information pushed by the reading application occupies more system resources of a terminal, and when the terminal is in a network-connected state, the pushing of this type of information also generates a large amount of network traffic. Consequently, unnecessary communication costs are increased for the terminal user. Since this type of information is mostly advertising information, advertising information is taken as an example. Therefore, the advertising information is intercepted by using the application used for information interception, and an interception policy is separately configured for each of the at least one to-be-intercepted application except the first application, so that the interception policy may be separately set for each of the at least one to-be-intercepted application. Therefore, the information interception for the advertising information is more targeted, so that the efficiency/rate of the information interception is faster and the precision of the information interception is higher.

Step 102. Obtain a network request sent by the at least one to-be-intercepted application, detect whether to enter an interception mode of the first application currently; if yes, perform step 103; otherwise, perform step 106 of releasing the network request, and performing communication in a normal communication mode, that is, skipping intercepting the network request.

Herein, for the interception mode: 1) If a user sets, in the application used for information interception, that requests sent by which applications are to be intercepted. For example, there are some applications set in an interception list, so that after the application used for information interception enters the interception mode, interception monitoring is performed on these applications in the interception list. That is: whether the requests sent by these applications are network requests, or whether the requests sent by these applications are normal network requests or advertising requests that need to be intercepted are monitored, so as to monitor advertising information. 2) An interception demand may further be set in multiple applications that need to be monitored, so that after the application used for information interception enters the interception mode, interception monitoring is performed on the multiple applications according to the interception demand. That is, whether the requests sent by these applications are network requests, or whether the requests sent by these applications are normal network requests or advertising requests that need to be intercepted are monitored, so as to monitor advertising information.

Step 103. Enter the interception mode of the first application, and monitor, according to the interception policy of the at least one to-be-intercepted application, the network request sent by the at least one to-be-intercepted application, to obtain, through matching, communication information that conforms to the interception policy of the at least one to-be-intercepted application, where the communication information is associated with the network request.

Herein, the communication information is information that conforms to the interception policy and that is associated with the network request. The communication information includes but is not limited to two types of information. Taking an example in which the network request is an abnormal communication request (advertising request), the two types of information specifically is advertising information at which an advertising request is directed, and application information corresponding to an application that sends the advertising request. Thus in the subsequent step 104, so as to obtain, through matching, that the network request is directed at advertising information, so that the network request is determined as the advertising request, and needs to be intercepted, and the advertising request is discarded. Further, the application information may be used to locate and trace an application that sends the advertising request. Therefore, according to the interception policy, a multi-feature audit policy, and the two types of information, information interception can be implemented and the application that sends the network request can be located, so that the efficiency/rate of the information interception is faster and the precision of the information interception is higher.

Herein, the interception policy of the at least one to-be-intercepted application may be a hook monitoring policy. The hook is a monitoring method. A window instance is used as an example for description. The hook is used as a platform of a window message processing mechanism. In an application, a subprocess may be set on the hook to monitor a message of a specified window, and the monitored window may be created by another subprocess. After the message arrives, the message is processed by a hook mechanism before a target window processing function processes the message. A hook mechanism allows an application program to capture and process a window message or a specified event. The hook mechanism is actually a program segment for processing a message, and by means of a system call, the program segment is hooked into the system. Each time the window message or specified event is sent, before arriving at a target window, the window message or specified event is first captured by a hook program, that is, a hook function first obtains a right to control the window. In this case, the hook function may process the window message or specified event, may perform no processing but continue to transmit the window message or specified event, or may force to end transmission of the window message or specified event.

Step 104. Match the communication information according to an information multi-feature audit policy; and if determining, through matching, that the communication information is specified target information, perform step 105; otherwise, perform step 106 of releasing the network request, and performing communication in a normal communication mode, that is, skipping intercepting the network request.

Herein, the communication information includes two types of information: information corresponding to the network request (for example, advertising information), and information corresponding to a current application that initiates the network request (for example, application information). By means of step 104, it is determined, through matching, that the communication information is specified target information, for example, advertising information corresponding to an abnormal communication request (advertising request), so that in combination with step 105, the network request is intercepted, the network request is discarded, and the current application that sends the network request is located and traced. Not only information interception can be implemented, but also the application that sends the network request can be located. Therefore, efficiency/rate of the information interception is faster and the precision of the information interception is higher.

Step 105. Intercept the network request, discard the network request, and locate and trace the current application that sends the network request.

Step 106. Release the network request, and perform communication in a normal communication mode, that is, skip intercepting the network request.

This embodiment of the present disclosure, when a network request is an abnormal communication request (for example, advertising request), avoids cases in which a normal network request may be intercepted due to an interception error in advertising information interception of an advertising request, and avoids cases in which information interception of a real advertising information request may be missed due to an interception error. By using this embodiment of the present disclosure, these problems can be resolved, so as to maximize the increase of the precision of the information interception, and improve the efficiency/rate of the information interception.

Figure 3:
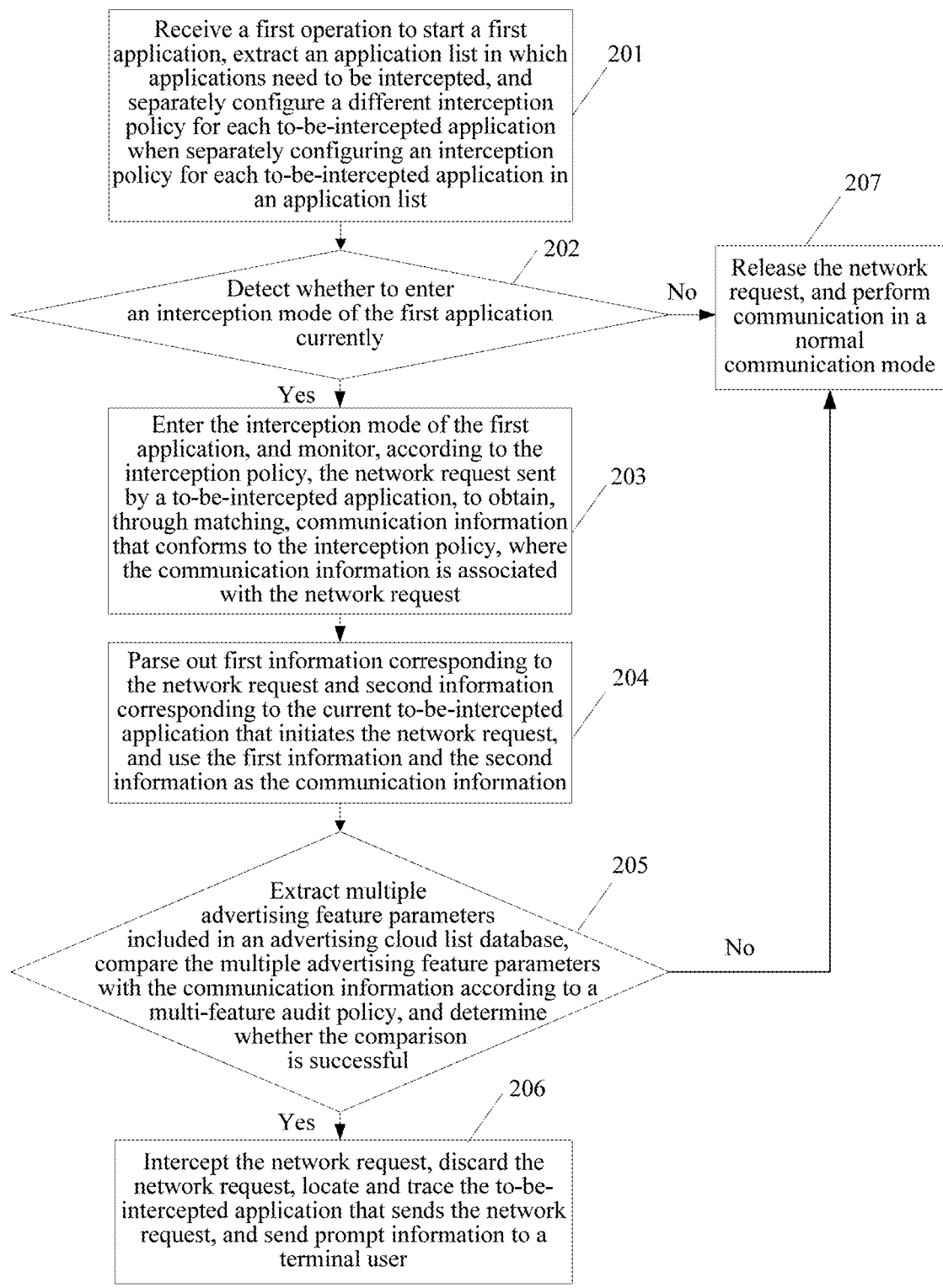
FIG. 3 is a schematic diagram of an implementation process according to some embodiments of the present disclosure.

This embodiment of the present disclosure provides an information interception processing method. As shown in FIG. 3, the method includes:

Step 201. Receive a first operation to start a first application, extract an application list in which applications need to be intercepted, and separately configure a different interception policy for each to-be-intercepted application in the application list.

Herein, setting different interception policies means that for advertising information corresponding to a same advertising request, in different applications, information interception policies may be set in some applications, and information interception policies do not need to be set in some applications. For example, for a shopping application, an advertising form related to shopping is displayed in the shopping application in an interstitial advertising or embedded advertising form. For the shopping application, the advertising form is inherent to the shopping application. Therefore, for the shopping application, information interception for the advertising form does not need to be set. For a music application, a video application, or a reading application, if an advertising form related to shopping is also displayed in an interstitial advertising or embedded advertising form, information interception for the advertising form needs to be set. Certainly, for multiple shopping applications that are of a same shopping type, such as the Dangdang application or the Jingdong application, a same policy may be set, that is, information interception for the advertising form does not need to be set.

Herein, terminals in this step refer to the second type of terminals mentioned in the foregoing overview. The second type of terminals may be terminals in which ordinary users are located, or referred to as objects displayed or exposed by advertising. The terminals may comprise a memory storing instructions. The terminals may also comprises a processor in communication with the memory and executing the instructions.

Herein, the first application serves as an application used for information interception, and may include but not limited to the Optimization Master, and the like. The at least one to-be-intercepted application except the first application may be a video application, a music playing application, a reading application, a browser application and the like that are installed in a terminal. If a network request is an advertising request, advertising information is intercepted by the application used for information interception. In a scenario of pushing a large amount of information to a user, much information is invalid information that user does not need, or is information that user has no concern about. For example, when the user reads a book by using a reading application, more information such as product advertising information or latest game information pushed by the reading application occupies more system resources of a terminal, and when the terminal is in a network-connected state, the pushing of this type of information also generates a large amount of network traffic. Consequently, unnecessary communication costs are increased for the terminal user. Since this type of information is mostly advertising information, advertising information is taken as an example. Therefore, the advertising information is intercepted by using the application used for information interception, and an interception policy is separately configured for each of the at least one to-be-intercepted application except the first application, so that the interception policy may be separately set for each of the at least one to-be-intercepted application. Therefore, the information interception for the advertising information is more targeted, so that the efficiency/rate of the information interception is faster and the precision of the information interception is higher.

Step 202. Obtain a network request sent by the at least one to-be-intercepted application, detect whether to enter an interception mode of the first application currently; if yes, perform step 203; otherwise, perform step 207 of releasing the network request, and performing communication in a normal communication mode, that is, skipping intercepting the network request.

Herein, for the interception mode: 1) If a user sets, in the application used for information interception, that requests sent by which applications are to be intercepted. For example, there are some applications set in an interception list, so that after the application used for information interception enters the interception mode, interception monitoring is performed on these applications in the interception list. That is: whether the requests sent by these applications are network requests, or whether the requests sent by these applications are normal network requests or advertising requests that need to be intercepted are monitored, so as to monitor advertising information. 2) An interception demand may further be set in multiple applications that need to be monitored, so that after the application used for information interception enters the interception mode, interception monitoring is performed on the multiple applications according to the interception demand. That is, whether the requests sent by these applications are network requests, or whether the requests sent by these applications are normal network requests or advertising requests that need to be intercepted are monitored, so as to monitor advertising information.

Step 203. Enter the interception mode of the first application, and monitoring, according to the interception policy of the at least one to-be-intercepted application, the network request sent by the at least one to-be-intercepted application, to obtain, through matching, communication information that conforms to the interception policy of the at least one to-be-intercepted application, where the communication information is associated with the network request.

Herein, the communication information is information that conforms to the interception policy and that is associated with the network request. The communication information includes but is not limited to two types of information. Taking an example in which the network request is an abnormal communication request (advertising request), the two types of information specifically is advertising information at which an advertising request is directed, and application information corresponding to an application that sends the advertising request. Thus in the subsequent steps 204 to 205, so as to obtain, through matching, that the network request is directed at advertising information, so that the network request is determined as the advertising request, and needs to be intercepted, and the advertising request is discarded. Further, the application information may be used to locate and trace an application that sends the advertising request. Therefore, according to the interception policy, a multi-feature audit policy, and the two types of information, information interception can be implemented and the application that sends the network request can be located, so that the efficiency/rate of the information interception is faster and the precision of the information interception is higher.

Herein, the interception policy of the at least one to-be-intercepted application may be a hook monitoring policy. The hook is a monitoring method. A window instance is used as an example for description. The hook is used as a platform of a window message processing mechanism. In an application, a subprocess may be set on the hook to monitor a message of a specified window, and the monitored window may be created by another subprocess. After the message arrives, the message is processed by a hook mechanism before a target window processing function processes the message. A hook mechanism allows an application program to capture and process a window message or a specified event. The hook mechanism is actually a program segment for processing a message, and by means of a system call, the program segment is hooked into the system. Each time the window message or specified event is sent, before arriving at a target window, the window message or specified event is first captured by a hook program, that is, a hook function first obtains a right to control the window. In this case, the hook function may process the window message or specified event, may perform no processing but continue to transmit the window message or specified event, or may force to end transmission of the window message or specified event.

Step 204. Parse out first information corresponding to the network request (for example, advertising information) and second information corresponding to the current to-be-intercepted application that initiates the network request (for example, application information corresponding to the application that sends the network request), and use the first information and the second information as the communication information.

Step 205. Extract multiple advertising feature parameters included in an advertising cloud list database, compare the multiple advertising feature parameters with the communication information according to a multi-feature audit policy, and if the comparison is successful, determine that the communication information is advertising information, and perform step 206; otherwise, perform step 207 of releasing the network request, and performing communication in a normal communication mode, that is, skipping intercepting the network request.

Herein, the communication information includes two types of information: information corresponding to the network request (for example, advertising information), and information corresponding to a current application that initiates the network request (for example, application information). By means of step 205, it is determined, through comparing (or matching), that the communication information is specified target information, for example, advertising information corresponding to an abnormal communication request (advertising request), so that in combination with step 206, the network request is intercepted, the network request is discarded, and the current application that sends the network request is located and traced. Not only information interception can be implemented, but also the application that sends the network request can be located. Therefore, the efficiency/rate of the information interception is faster and the precision of the information interception is higher.

Step 206. Intercept the network request, discard the network request, locate and trace the current application that sends the network request, and send prompt information to a terminal user.

Figure 4:
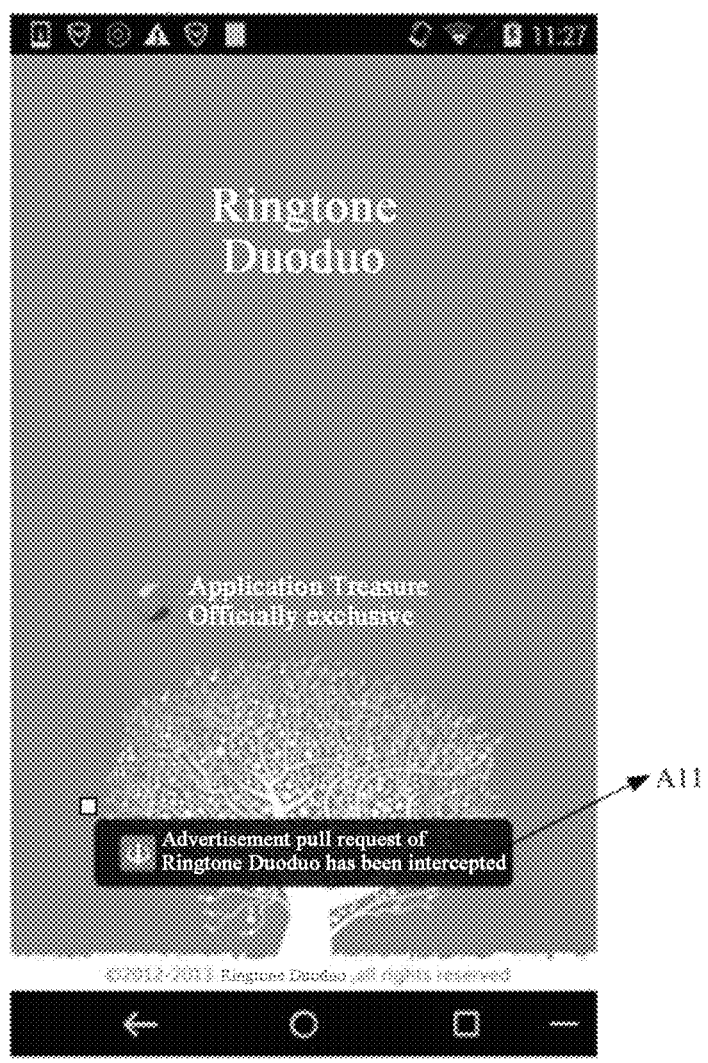
FIG. 4 is a schematic diagram of an example of a prompt information application according to some embodiments of the present disclosure.

Herein, the prompt information is used for representing an information security risk that exists in the current application. An instance of the prompt information is as A11 shown in FIG. 4.

Step 207. Release the network request, and perform communication in a normal communication mode, that is, skip intercepting the network request.

This embodiment of the present disclosure, when a network request is an abnormal communication request (for example, advertising request), avoids cases in which a normal network request may be intercepted due to an interception error in advertising information interception of an advertising request, and avoids cases in which information interception of a real advertising information request may be missed due to an interception error. By using this embodiment of the present disclosure, these problems can be resolved, so as to maximize the increase of the precision of the information interception, and improve the efficiency/rate of the information interception. In addition, in addition to that the network request can be intercepted and the current application that sends the network request is located and traced, a user may further be prompted to that a security risk exists in the application, so that the security is improved.

Based on the foregoing embodiments, the information interception method of the embodiments of the present disclosure further includes: establishing an association between the first application and X target processes of at least one to-be-intercepted application except the first application, where X is a natural number greater than 1; and making the first application enter the X target processes according to the established association, to monitor the X target processes. The mechanism of establishing an association between X target processes and a process of the first application to perform monitoring may include an injection mechanism.

In an implementation of this embodiment of the present disclosure, in the information interception method of the embodiments of the present disclosure, the monitoring, according to the interception policy of the at least one to-be-intercepted application, the network request sent by the at least one to-be-intercepted application, to obtain, through matching, communication information that conforms to the interception policy includes: monitoring interactions of network requests in the X target processes, to capture the network request; and setting a monitoring detection interface at a request message forwarding node of the network request according to the interception policy, and obtaining the communication information according to the monitoring detection interface.

Herein, the request message forwarding node of the network request may become a node that sends a message or receives a message, and is specifically implemented by using a sending function and a receiving function. The monitoring detection interface may be implemented in a hook monitoring method mentioned in the foregoing. For the sending function and the receiving function, for a first function sendto and a second function recvfrom that are used for representing the request message forwarding node, the first function sendto is a specific instance of the sending function, and the second function recvfrom is a specific instance of the receiving function. A hook function is set in the first function sendto and the second function recvfrom, to generate a first monitoring function hook_sendto and a second monitoring function hook_recvfrom that are used for monitoring interactions of the network requests, and the first monitoring function hook_sendto and the second monitoring function hook_recvfrom are used as the monitoring detection interface.

Figure 5:
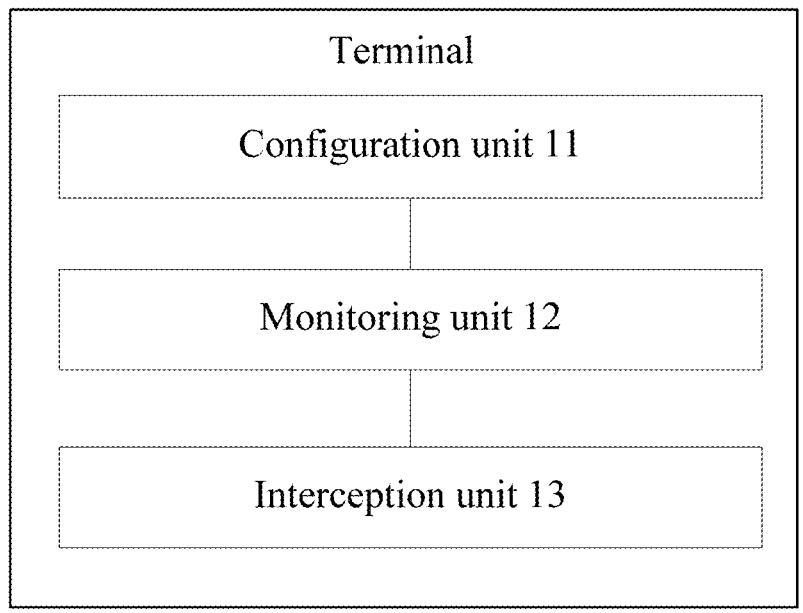
FIG. 5 is a schematic diagram of a constitution structure according to some embodiments of the present disclosure.

This embodiment of the present disclosure provides a terminal. As shown in FIG. 5, the terminal includes:

a configuration unit 11, configured to receive a first operation to start a first application, extract an application list in which applications need to be intercepted, and separately configure an interception policy for each to-be-intercepted application in the application list;

a monitoring unit 12, configured to obtain a network request sent by a to-be-intercepted application, and monitor, when the first application enters an interception mode, according to the configured interception policy, the network request sent by the to-be-intercepted application, to obtain, through matching, communication information that conforms to the interception policy of the at least one to-be-intercepted application, where the communication information is associated with the network request; and an interception unit 13, configured to match the communication information according to an information multi-feature audit policy, intercept the network request if it is determined, through matching, that the communication information is specified target information, and locate and trace the to-be-intercepted application that sends the network request.

In actual application, terminals in this step refer to the second type of terminals mentioned in the foregoing overview. The second type of terminals may be terminals in which ordinary users are located, or referred to as objects displayed or exposed by advertising.

Herein, the first application serves as an application used for information interception, and may include but not limited to the Optimization Master, and the like. The at least one to-be-intercepted application except the first application may be a video application, a music playing application, a reading application, a browser application and the like that are installed in a terminal. If a network request is an advertising request, advertising information is intercepted by the application used for information interception. In a scenario of pushing a large amount of information to a user, much information is invalid information that user does not need, or is information that user has no concern about. For example, when the user reads a book by using a reading application, more information such as product advertising information or latest game information pushed by the reading application occupies more system resources of a terminal, and when the terminal is in a network-connected state, the pushing of this type of information also generates a large amount of network traffic. Consequently, unnecessary communication costs are increased for the terminal user. Since this type of information is mostly advertising information, advertising information is taken as an example. Therefore, the advertising information is intercepted by using the application used for information interception, and an interception policy is separately configured for each of the at least one to-be-intercepted application except the first application, so that the interception policy may be separately set for each of the at least one to-be-intercepted application. Therefore, the information interception for the advertising information is more targeted, so that the efficiency/rate of the information interception is faster and the precision of the information interception is higher.

Herein, for the interception mode: 1) If a user sets, in the application used for information interception, that requests sent by which applications are to be intercepted. For example, there are some applications set in an interception list, so that after the application used for information interception enters the interception mode, interception monitoring is performed on these applications in the interception list. That is: whether the requests sent by these applications are network requests, or whether the requests sent by these applications are normal network requests or advertising requests that need to be intercepted are monitored, so as to monitor advertising information. 2) An interception demand may further be set in multiple applications that need to be monitored, so that after the application used for information interception enters the interception mode, interception monitoring is performed on the multiple applications according to the interception demand. That is, whether the requests sent by these applications are network requests, or whether the requests sent by these applications are normal network requests or advertising requests that need to be intercepted are monitored, so as to monitor advertising information.

Herein, the communication information is information that conforms to the interception policy and that is associated with the network request. The communication information includes but is not limited to two types of information. Taking an example in which the network request is an abnormal communication request (advertising request), the two types of information specifically is advertising information at which an advertising request is directed, and application information corresponding to an application that sends the advertising request. Thus subsequently, obtain, through matching, that the network request is directed at advertising information, so that the network request is determined as the advertising request, and needs to be intercepted, and the advertising request is discarded. Further, the application information may be used to locate and trace an application that sends the advertising request. Therefore, according to the interception policy, a multi-feature audit policy, and the two types of information, information interception can be implemented and the application that sends the network request can be located, so that the efficiency/rate of the information interception is faster and the precision of the information interception is higher.

Herein, the communication information includes two types of information: information corresponding to the network request (for example, advertising information), and information corresponding to a current application that initiates the network request (for example, application information). When it is determined, through matching, that the communication information is specified target information, for example, advertising information corresponding to an abnormal communication request (advertising request), so that subsequently, the network request is intercepted, the network request is discarded, and the current application that sends the network request is located and traced. Not only information interception can be implemented, but also the application that sends the network request can be located. Therefore, the efficiency/rate of the information interception is faster and the precision of the information interception is higher.

This embodiment of the present disclosure, when a network request is an abnormal communication request (for example, advertising request), avoids cases in which a normal network request may be intercepted due to an interception error in advertising information interception of an advertising request, and avoids cases in which information interception of a real advertising information request may be missed due to an interception error. By using this embodiment of the present disclosure, these problems can be resolved, so as to maximize the increase of the precision of the information interception, and improve the efficiency/rate of the information interception.

In an implementation of this embodiment of the present disclosure, the interception unit further includes: a parsing subunit, configured to parse out first information corresponding to the network request and second information corresponding to the current to-be-intercepted application that initiates the network request, and use the first information and the second information as the communication information; and an audit subunit, configured to extract multiple advertising feature parameters included in an advertising cloud list database, compare the multiple advertising feature parameters with the communication information according to a multi-feature audit policy, and if the comparison is successful, determine that the communication information is advertising information, locate the current application that initiates the network request, intercept the network request, and send prompt information to a terminal user, where the prompt information is used for representing an information security risk that exists in the current application.

In an implementation of this embodiment of the present disclosure, the configuration unit is further configured to separately configure the interception policy for each to-be-intercepted application in at least one to-be-intercepted application except the first application, where the interception policy is a same policy or a different policy.

In an implementation of this embodiment of the present disclosure, the terminal further includes: a process injection association unit, configured to: establish an association between the first application and X target processes of at least one to-be-intercepted application except the first application, where X is a natural number greater than 1; and make the first application enter the X target processes according to the established association, to monitor the X target processes.

In an implementation of this embodiment of the present disclosure, the monitoring unit further includes: a network request monitoring subunit, configured to monitor interactions of network requests in the X target processes, to capture the network request; and an information monitoring subunit, configured to set a monitoring detection interface at a request message forwarding node of the network request according to the interception policy of the at least one to-be-intercepted application, and obtain the communication information according to the monitoring detection interface.

In an implementation of this embodiment of the present disclosure, the information monitoring subunit is further configured to: set hook functions in a first function sendto and a second function recvfrom that are used for representing the request message forwarding node, generate a first monitoring function hook_sendto and a second monitoring function hook_recvfrom that are used for monitoring interactions of network requests; and use the first monitoring function hook_sendto and the second monitoring function hook_recvfrom as the monitoring detection interface.

Herein, it should be noted that, the terminal may be an electronic device such as a PC, or may be a portable electronic device such as a PAD, a tablet computer, or a handheld computer, or may be a smart mobile terminal such as a mobile phone. The terminal is not limited to the description herein. The server may be formed by using a cluster system, and is an electronic device that combines unit functions into one or in which unit functions are disposed separately. A client and the server both at least include a database configured to store data and a processor configured to process data, or include a storage medium disposed in the server or a storage medium disposed separately.

For the processor configured to process data, processing may be performed by using a microprocessor, a central processing unit (CPU), a digital signal processor (DSP), or a field-programmable gate array (FPGA). The storage medium includes an operation instruction, the operation instruction may be computer executable code, and the operation instruction is used to implement the steps of the process of the foregoing information interception processing method in the embodiments of the present disclosure.

Figure 6:
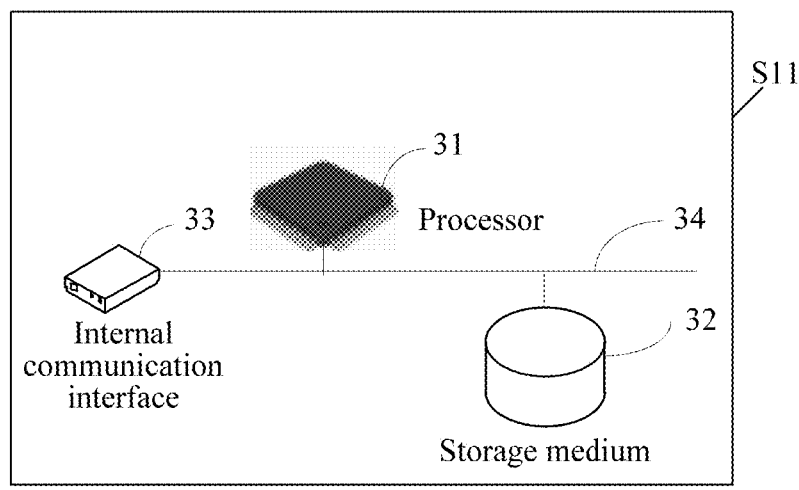
FIG. 6 is a schematic diagram of a constitution structure of hardware according to some embodiments of the present disclosure.

An example of a hardware entity (apparatus) S11 as which the terminal and the server serve is shown in FIG. 6. The apparatus includes a processor 31, a storage medium 32, and at least one external communication interface 33. The processor 31, the storage medium 32, and the external communication interface 33 are connected by using a bus 34.

Herein, it should be noted that, the foregoing description related to the terminal and the server is similar to the foregoing method, and the beneficial effect of the method is not described herein again. For technical details that are not disclosed in the client and server embodiments of the present disclosure, refer to the description of the method embodiment of the present disclosure.

This embodiment of the present disclosure further provides a computer storage medium storing computer executable instructions, where the computer executable instructions are used for performing the foregoing information interception processing method.

By using an application scenario as an example, this embodiment of the present disclosure is described as follows:

This application scenario is a case in which information interception is directed at advertising information. This embodiment of the present disclosure used in this application scenario is specifically a technical solution that can more flexibly and precisely perform information interception on the advertising information. An HTTP URL format involved in this specification refers to http://host[:port][abs_path], which is included in a domain name (host) file. The host file may be a system file without an extension. The main function of the host file is being capable of accelerating domain name resolution, and the host file may further block websites, or the like. A legal Internet host domain name or IP address is abs_path, and is used for specifying a uniform resource locator (URL) of a requested resource. The URL mentioned in the following is the part of abs_path. Passive advertising interception refers to: advertising information host is obtained through static scanning, then a system host file is modified or an iptable redirected method is used to forbid a mobile phone from accessing the advertising information host, and the advertising information is finally intercepted by the system. This type of application only sets a host, but does not know when the advertising information is intercepted, does not know whether the advertising information is intercepted, and does not know how to locate and trace the source of the advertising information. Active advertising interception refers to: network communication data is captured by using a hook key network communication interface or by using a local virtual private network (vpn), and an advertising request in the network communication data is parsed and intercepted. This type of application is a real advertising interceptor, and can monitor the advertising request of the application in real time. Interception precision refers to: a normal network request may be intercepted in advertising information interception due to an interception error, or interception of a real advertising information request may be missed due to an intercept error. These cases may reduce the precision of the information interception of advertising information.

In a case in which information interception is directed at advertising information, taking an example in which an information interception method in an instance is a passive information interception method (static interception), advertising information may be intercepted. To start intercepting the advertising information, an application needs to be statically scanned, so as to extract an advertising feature from the application, write the advertising feature into a host file, and obtain corresponding advertising information host in the host file. The advertising information host is directed at mapping of local domain names. To intercept information, the advertising information host is modified, to map the advertising request to an invalid or wrong IP address to intercept the advertising information. The disadvantages are: This method is very time-consuming in a starting stage, and the advertising feature does not have a real-time dynamic update mechanism; because interception is directed at host only, the interception precision is relatively low; some advertising applications may avoid static scanning in a plug-in or encryption method; after interception is started, the interception is performed based on the system, but when the advertisement is requested, and whether there is a requested advertisement cannot be known, and the source of the advertising information cannot be located and traced.

For a case in which information interception is directed at advertising information, by using an example in which an information interception method in another instance is an active information interception method (dynamic interception), a local vpn form is used to capture network communication data, or advertising information may be intercepted. The disadvantages are: On one hand, because the local vpn form is directed at monitoring all http requests, that is, a normal network request is directed at in addition to an advertising request, and an interception rule is also effective to http requests corresponding to all applications, and because the advertising request and the normal network request cannot be well distinguished, it is very likely that the normal network request that should not be intercepted and blocked is intercepted wrongly. On the other hand, forwarding of the http request cannot be performed by using the local vpn form, and the forwarding of the http request can only be executed by the system, so that processing nodes for interception and a forwarding request are different (interception is performed by a processing node at a vpn side, and a forwarding request is executed by a processing node at a system side). Consequently, a processing node at a vpn side cannot trace the entire processing process of the entire http request, that is, communication data on the forwarded vpn cannot be traced. Therefore, similar to the foregoing passive information interception method, the source of the advertising information also cannot be located and traced to completely eliminate and intercept the advertising information. The communication data on the vpn cannot be traced, and although the advertising information may be intercepted, that the advertising information is requested from which application is not known. Therefore, a single application cannot be set, and is not flexible enough to avoid the single application from initiating the advertising request again. All data needs to be forwarded by a vpn process. If the process accidentally exits, communication of the entire system is affected, and the disaster tolerance is poor. A capability of information interactions between the cloud and the local side is lacked, and an advertising feature in an advertising database cannot be dynamically updated in time at the local side.

This embodiment of the present disclosure is used in this application scenario, an active information interception method (dynamic interception) may be used, and an interception mechanism different from those in the foregoing 2 instances is used. The interception mechanism includes two parts of content.

1. Based on an injection technology and a hook technology, an interception system architecture is designed at a terminal side. First, by using the injection technology, a new thread is created in a starting process of this application that is at the terminal and that is used for intercepting advertising information (for example, the Purification Master application based on an Android platform or another interception application based on an Android platform or another interception application based on another platform such as an ISO platform). A process of another application that needs to be monitored by using the application used for intercepting advertising information, for example, a process of a browser application, a reading application, a video application, or a music playing application, is called in the new thread. That is, a mapping association is established between the application used for intercepting advertising information and another application that needs to be monitored and intercepted, so as to facilitate hook monitoring the process of another application by using the hook technology, to capture the http request to obtain network communication data, change an original path of the process of another application, and enter a hook monitoring path of this embodiment of the present disclosure. Specifically, this implementation process is implemented by the interception module in FIG. 12.

Using of the foregoing injection technology and hook technology has the following beneficial effects:

1) Real-time traceability: A part of static scanning is omitted, and when an application initiates an advertising request to send advertising information, the advertising information may be intercepted in real time, and the advertising application that initiates the advertising request is traced, to notify users that the application has advertisements.

2) More flexible and convenient: If users do not intend to intercept an advertising request of an application, the users may set starting or closing advertising interception for the single application.

3) Better disaster tolerance: A host application is also referred to as this application used for intercepting advertising information, and is, for example, the Purification Master application based on an Android platform or another interception application based on an Android platform or another interception application based on another platform such as an ISO platform. After a process in the host application is accidentally dead, the use of a normal network of a mobile phone application is not affected.

2. After the network communication data is captured by using a key interface of the hook technology, auditing is performed on the captured network communication data by using a cloud advertising auditing mechanism based on multiple features, and if it is determined, through auditing, that the network communication data is advertising information, the advertising request may be monitored in real time and the application that sends the advertising request may be traced. For auditing performed by using the cloud advertising auditing mechanism based on multiple features, an advertising cloud list database is established, including multiple advertising feature parameters such as a package name, a version, a signature, an MD5, a host, and an URL. With reference to the local hook technology, comparison and auditing of the foregoing advertising feature parameters are performed on each http request, to ensure the maximized advertising information interception precision. In addition, the characteristic of comparison and auditing of the multiple advertising feature parameters of the advertising cloud list database make updating of the advertising base more timely and flexible. When the cloud advertising auditing mechanism based on multiple features is used, single applications may be distinguished in a directed method. Specifically, switch setting for advertising interception of single applications is provided. In this way, 1) the source of the advertising information can be located and traced, so as to completely eliminate and intercept the advertising information; 2) it is not a static scanning process, but an advertising feature dynamic update process, and has a better scanning effect, so that a latest advertising feature can be known in time, to perform operations such as comparing, intercepting, and blocking of advertising features; 3) in addition to that the advertising request is sent by which application can be traced, single applications can be set to be intercepted, the rule setting that directed distinguishing is performed on single applications, instead of all applications are set to be intercepted (switch setting for advertising interception of single applications is provided) makes the interception and the interactions more flexible. The directed distinguishing performed on single applications may also prevent the single applications from initiating an advertising request again. Therefore, the cloud advertising auditing mechanism based on multiple features is used to implement the advertising feature distinguishing and auditing process by using the audit module in FIG. 12, so that the advertising interception is more precise, and the updating of the advertising feature database list is also more rapid and timely.

By using the Purification Master application based on an Android platform as an example, the following description is provided by starting a user interface of the Purification Master application by a terminal (for example, different scenarios corresponding to FIG. 7 to FIG. 10):

By using this embodiment of the present disclosure, applications in the Purification Master application (for example, in a pure mode of the application) are to help a user automatically intercept an advertising request sent by an application, so that the user avoids being interrupted by unconcerned information or invalid information (for example, advertising information), avoids consuming system resources of the terminal, and reduces problems that communication costs of the terminal are increased due to the consumption of traffic generated by pushing of the advertising information.

Figure 7:
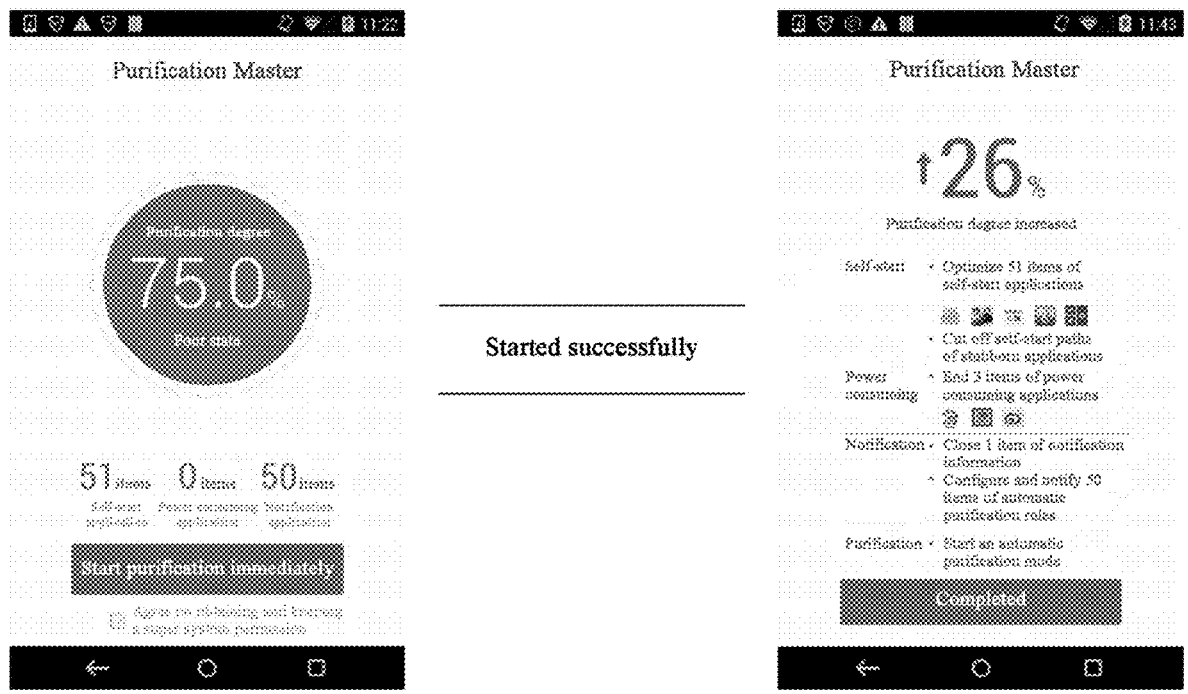
FIG. 7 to FIG. 10 are schematic diagrams of applying interfaces of multiple terminal users according to the embodiments of the present disclosure.
Figure 8:
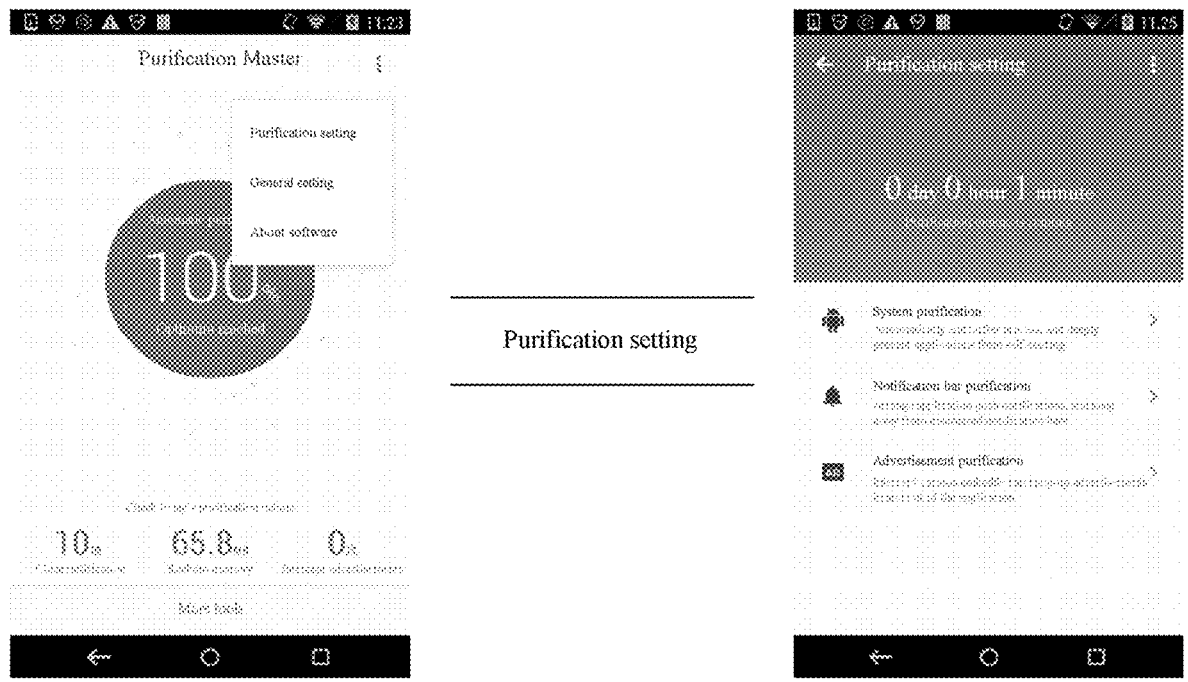
Figure 9:
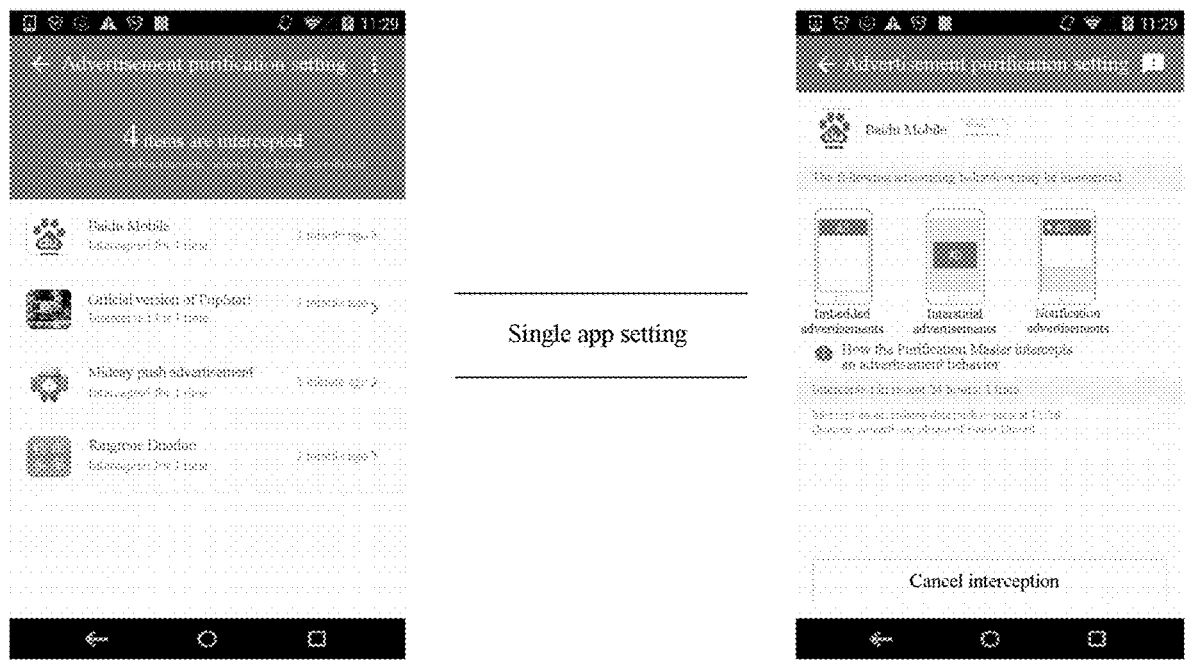
Figure 10:

FIG. 7 to FIG. 10 are schematic diagrams of a user interface of a terminal when the Purification Master is applied. An example of a scenario of an advertising interception starting process is shown in FIG. 7. In FIG. 7, after entering the home page of the Purification Master application, purification starts immediately to enter an interception mode. After the interception mode starts successfully, a result page displays. An example of a scenario used for advertising interception is shown in FIG. 8. In FIG. 8, after an interception mode starts successfully, the advertising interception automatically runs. When a user opens software that has an advertisement, the Purification Master automatically intercepts and display prompt information. An example of prompt information is as A11 shown in FIG. 4. An example of a scenario of intercepting information and setting interception is shown in FIG. 8 to FIG. 9. FIG. 8 records a detailed interception log for specific software. Clicking advertising purification may perform information interception processing (or may be purification processing) according to an interception policy separately set for each application. An example of entering single app setting after clicking advertising purification is shown in FIG. 9. For interception records of all advertising software, advertising purification is clicked to enter the single app setting, and a behavior of a specific advertising request is displayed. FIG. 10 is an example of video advertising interception setting. A user interface for a video advertising interception function may be opened at a product side of the Purification Master. The cloud advertising base also has new video advertising features, and currently, supports interception of most mainstream video software advertisements. The starting process is shown in FIG. 10. The user may click the top of the purification setting page for continuous five times to activate a developer mode, and click the top menu to select the developer mode to set a setting entering list, and the user may start the video application advertising interception.

Figure 11:
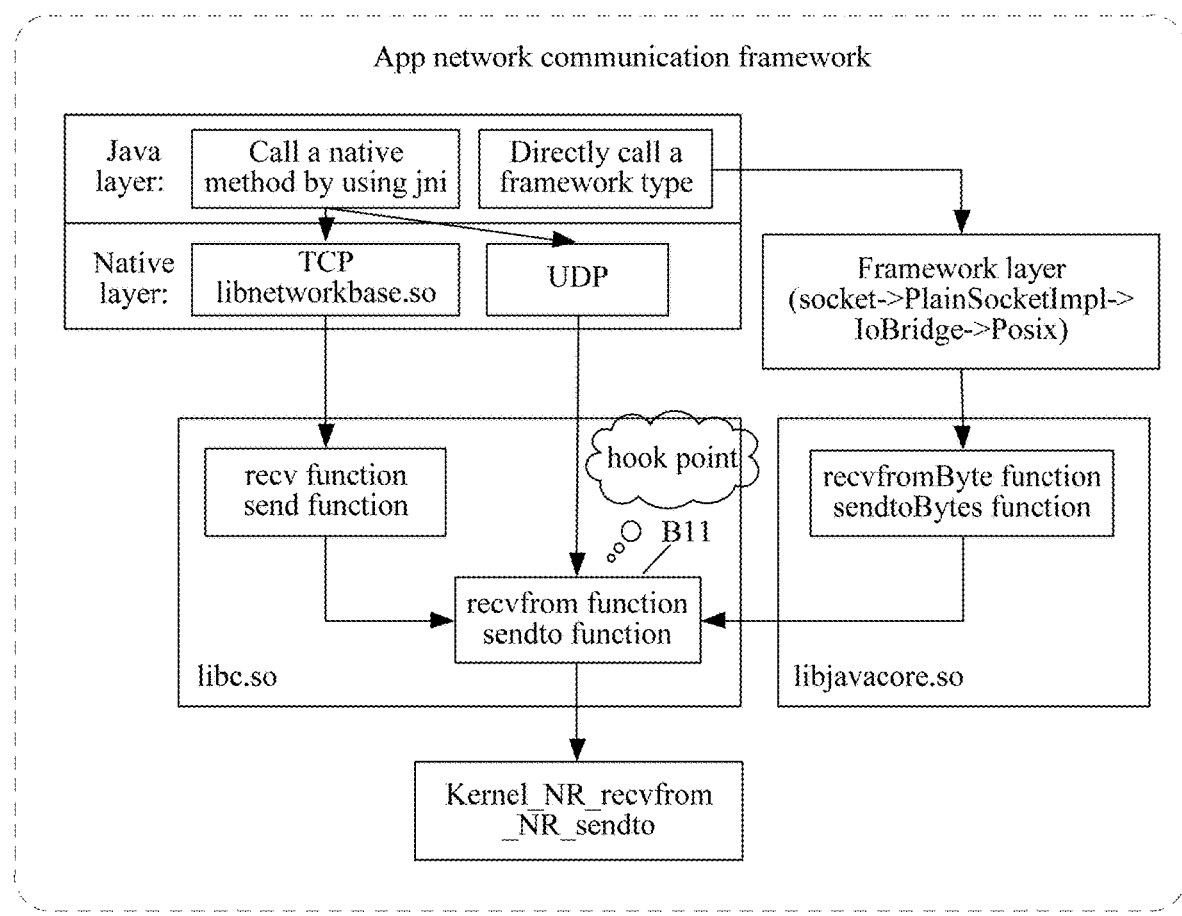
FIG. 11 is a schematic diagram of applying an original network communication node in a network communication architecture according to the embodiments of the present disclosure.

By using an Android platform as an example, this embodiment of the present disclosure is used in this application scenario. In a process of implementing interception processing, the interception processing is implemented by using an injection mechanism, a hook monitoring method, and a multi-advertising feature cloud auditing method. Specific solutions are as follows:

For each application installed in an Android platform by a terminal, a network communication framework is shown in FIG. 11. As can be seen from FIG. 11: no matter whether the network request (http request) is called at a Java layer, a Native layer, or a Framework layer, the network request is finally returned to a position of a function (sendto and/or recvfrom function) B11 corresponding to a request forwarding node. That is, all network communications are finally through the sendto function and the recvfrom function. Therefore, it may be considered that a monitoring detection point of a hook monitoring method is set at the position B11, so that the network request of the App can be monitored by using the two functions of the hook, so as to set hook functions in a first function sendto (a function used for representing sending of a request message) and a second function recvfrom (a function used for representing receiving of a request message) that are used for representing the request message forwarding node, to generate a first monitoring function hook_sendto and a second monitoring function hook_recvfrom that are used for monitoring interactions of network requests; and to use the first monitoring function hook_sendto (a monitoring function used for representing monitoring sending of a request message) and a second monitoring function hook_recvfrom (a monitoring function used for representing monitoring receiving of a request message) as the monitoring detection interface, as shown in FIG. 12.

Figure 12:
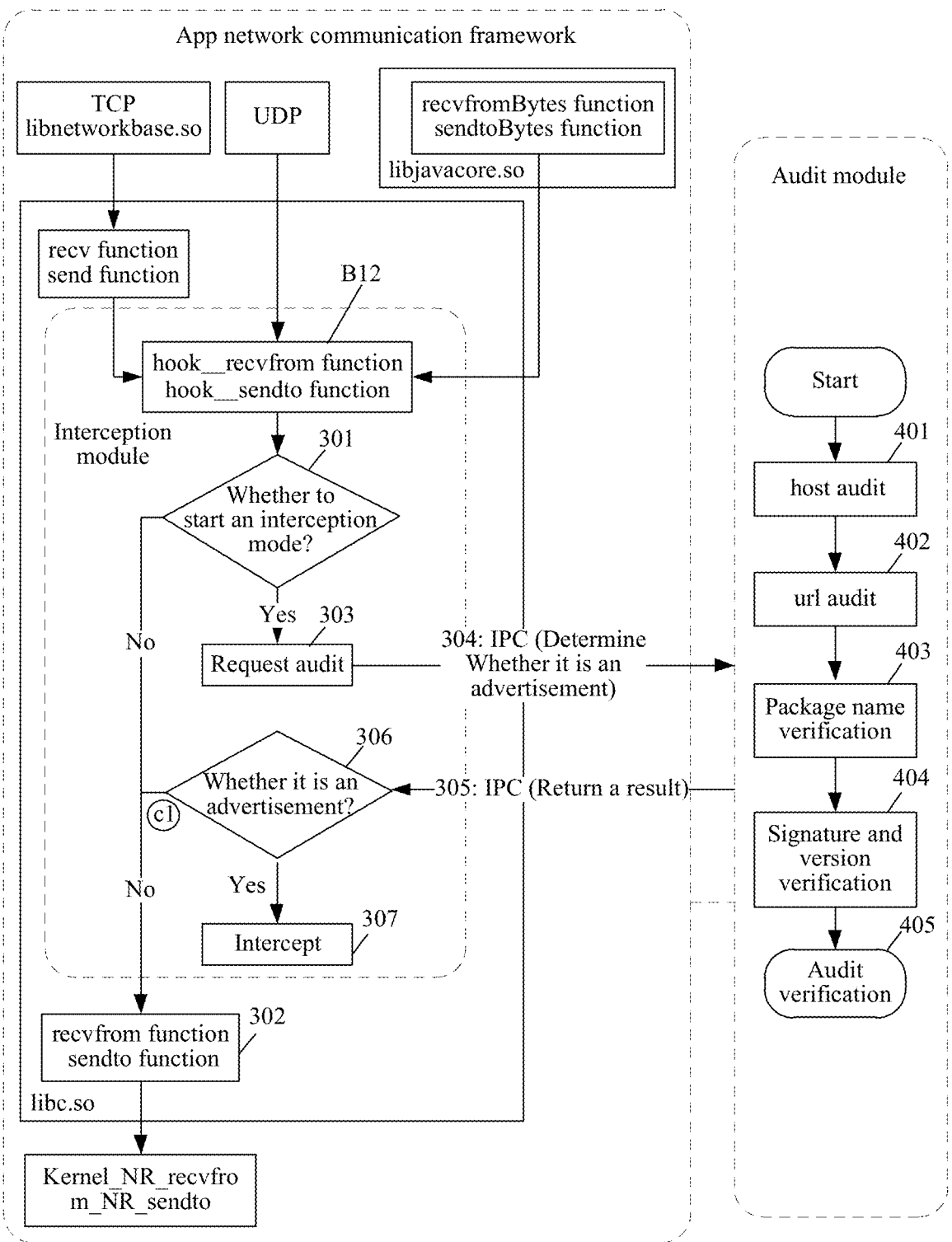
FIG. 12 is a schematic diagram of applying a network communication node of a new monitoring detection point in a network communication architecture according to the embodiments of the present disclosure.

FIG. 12 is a schematic diagram of a network communication framework to which an interception module and an audit module are added. After a hook is set in a sendto function and/or a recvfrom function, a first monitoring function hook_sendto and a second monitoring function hook_recvfrom are obtained. The first monitoring function hook_sendto (a monitoring function used for representing monitoring sending of a request message) and the second monitoring function hook_recvfrom (a monitoring function used for representing monitoring receiving of a request message) are shown as the position of B12 in FIG. 12. The interception process is implemented by an interception module, and is mainly: detecting whether to start an interception mode, if yes, monitoring is performed by using a hook monitoring method, a monitoring result is packaged to an audit module for auditing, and after an audit result is obtained, if the audit result is an advertisement, the advertising request is discarded; otherwise, a normal network communication is performed. The specific process is shown as steps 301 to 307. The auditing process is implemented by an audit module, and is mainly: comparing advertising databases that are dynamically updated to the local terminal in real time from a server cloud and that include multiple advertising feature parameters, and returning an audit result obtained through comparison to the interception module for directed interception processing. The specific process is shown in the following steps 401 to 405.

As shown in FIG. 11, in a specific process of the interception module, first the Purification Master application is loaded, by using the injection mechanism, to a target process of another application that needs to be monitored, then key functions recvfrom and sendto of the hook network communication are used, and callback application network communication may be waited. The callback processing process includes the following steps:

Step 301. After receiving the network request, determine whether the interception module is started, that is, determine whether an interception mode is entered; if yes, perform step 303; otherwise, perform step 302.

Herein, the determining of entering an interception mode is implemented by using advertising interception switch setting directed at single users shown in FIG. 8 to FIG. 9.

Step 302. Call an original communication function to perform a normal network communication process, for example, with revfrom function and/or sendto function.

Herein, if the user sets to not intercept the application, the original communication function may be directly called to perform a normal network communication process.

Step 303. Package requested data and information of the current application. Herein, if the user sets to intercept advertising of the current application are packaged, and auditing performed at the audit module is requested.

Step 304. Submit the packaged information to an audit process (audit process corresponding to an audit module) of a remote end through an IPC communication, and wait for an audit result.

Step 305. The application obtains the audit result of the remote end process (audit process corresponding to the audit module) through the IPC communication.

Step 306. Parse the audit result, determine whether the audit result is an advertising request; if yes, perform step 307; if the audit result that is parsed out is not an advertising request, perform step 302.

Step 307. If the audit result that is parsed out is an advertising request, perform interception processing, that is, discard the advertising request.

As shown in FIG. 12, the specific process of the audit module includes the following steps:

Step 401. Host audit.

Step 402. URL audit.

Step 403. Package name verification.

Step 404. Signature and version verification.

Step 405. Audit verification.

In the several embodiments provided in this application, it should be understood that the disclosed device and method may be implemented in other methods. The described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, the functional units in the embodiments of the present disclosure may all be integrated into one processing unit, or each of the units may independently serve as one unit, or two or more units may be integrated into one unit. The integrated unit may be implemented in the form of hardware, or may be implemented in the form of a hardware plus software functional unit.

A person of ordinary skill in the art may understand that all or some of the steps of the foregoing method embodiments may be implemented by a program instructing relevant hardware. The program may be stored in a computer readable storage medium. When the program is performed, the steps of the foregoing method embodiments are performed. The storage medium includes various media that may store processing code, such as a removable storage device, a read-only memory, a random access memory, a magnetic disk, and an optical disc.

Alternatively, when the integrated units are implemented in a form of a software functional module and sold or used as an independent product, the units may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The storage medium includes various media that may store processing code, such as a removable storage device, a ROM, a RAM, a magnetic disk, and an optical disc.

The foregoing descriptions are merely specific implementation methods of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

By using the embodiments of the present disclosure, an interception policy may be separately configured for each of the at least one to-be-intercepted application except the first application. Because the interception policy may be separately set for each of the at least one to-be-intercepted application, the interception is more targeted, so that the efficiency/rate of the information interception is faster and the precision of the information interception is higher. After an interception mode is entered, after a network request is detected, if communication information associated with the network request is matched with a preset policy to obtain specified target information, the network request may be intercepted, and a to-be-intercepted application that sends the network request may be located and traced. Because information can be intercepted, and the to-be-intercepted application that sends the network request can be located, the efficiency/rate of the information interception is faster and the precision of the information interception is higher. Further, a user may be prompted to know that a security risk exists in the to-be-intercepted application, so that the security is improved.

What is claimed is:

1. A method for information interception processing, the method comprising:
   starting, by a device comprising a memory and a processor in communication with the memory, a first application;
   obtaining, by the device, a network request sent by a to-be-intercepted application; and
   when the first application enters an interception mode:
   monitoring, by the device, interactions of network requests in X target processes, to capture the network request, X being a natural number greater than 1,
   setting, by the device, hook functions in a first function sendto and a second function recvfrom that are used for representing a request message forwarding node,
   generating, by the device, a first monitoring function hook_sendto and a second monitoring function hook_recvfrom that are used for monitoring interactions of network requests,
   using, by the device, the first monitoring function hook_sendto and the second monitoring function hook_recvfrom as a monitoring detection interface,
   obtaining, by the device, communication information according to the monitoring detection interface,
   establishing, by the device, an association between the first application and the X target processes of each respective to-be-intercepted application in a list of applications, and
   making, by the device, the first application enter the X target processes according to the established association, to monitor the X target processes.

2. The method according to claim 1, further comprising:
   extracting, by the device, the list of applications that need to be intercepted; and
   configuring, by the device, an interception policy for the to-be-intercepted application in the list of applications.

3. The method according to claim 2, wherein, when the first application enters the interception mode, the method further comprises:
   matching, by the device, the communication information with a preset policy, and
   when it is determined, through matching, that the communication information is specified target information corresponding to the preset policy:
   intercepting, by the device, the network request, and
   locating and tracing, by the device, the to-be-intercepted application that sends the network request.

4. The method according to claim 3, wherein:
   the preset policy comprises specifically a multi-feature audit policy.

5. The method according to claim 2, wherein, when the first application enters the interception mode, the method further comprises:
   parsing out, by the device, first information corresponding to the network request and second information corresponding to the to-be-intercepted application that sends the network request;
   using, by the device, the first information and the second information as the communication information;
   extracting, by the device, multiple advertising feature parameters from an advertising cloud list database; and
   comparing, by the device, the multiple advertising feature parameters with the communication information according to a multi-feature audit policy.

6. The method according to claim 5, wherein, when the first application enters the interception mode, the method further comprises:
   determining, by the device, that the communication information is advertising information;
   locating, by the device, the to-be-intercepted application that sends the network request;
   intercepting, by the device, the network request; and
   sending, by the device, prompt information to a terminal user, the prompt information being used for representing an information security risk that exists in the to-be-intercepted application.

7. A device for information interception processing, comprising:
a memory storing instructions; and
a processor in communication with the memory, wherein, when the processor executes the instructions, the processor is configured to cause the device to:
start a first application,
obtain a network request sent by a to-be-intercepted application, and
when the first application enters an interception mode:
monitor interactions of network requests in X target processes, to capture the network request, X being a natural number greater than 1,
set hook functions in a first function sendto and a second function recvfrom that are used for representing a request message forwarding node,
generate a first monitoring function hook_sendto and a second monitoring function hook_recvfrom that are used for monitoring interactions of network requests,
use the first monitoring function hook_sendto and the second monitoring function hook_recvfrom as a monitoring detection interface,
obtain communication information according to the monitoring detection interface,
establish an association between the first application and the X target processes of each respective to-be-intercepted application in a list of applications, and
make the first application enter the X target processes according to the established association, to monitor the X target processes.

8. The device according to claim 7, wherein, when the processor executes the instructions, the processor is configured to further cause the device to:
extract the list of applications that need to be intercepted; and
configure an interception policy for the to-be-intercepted application in the list of applications.

9. The device according to claim 8, wherein, when the processor executes the instructions and the first application enters the interception mode, the processor is configured to further cause the device to:
match the communication information with a preset policy, and
when it is determined, through matching, that the communication information is specified target information corresponding to the preset policy:
intercept the network request, and
locate and trace the to-be-intercepted application that sends the network request.

10. The device according to claim 9, wherein:
the preset policy comprises specifically a multi-feature audit policy.

11. The device according to claim 8, wherein, when the processor executes the instructions and the first application enters the interception mode, the processor is configured to further cause the device to:
parse out first information corresponding to the network request and second information corresponding to the to-be-intercepted application that sends the network request;
use the first information and the second information as the communication information;
extract multiple advertising feature parameters from an advertising cloud list database; and
compare the multiple advertising feature parameters with the communication information according to a multi-feature audit policy.

12. The device according to claim 11, wherein, when the processor executes the instructions and the first application enters the interception mode, the processor is configured to further cause the device to:
determine that the communication information is advertising information;
locate the to-be-intercepted application that sends the network request;
intercept the network request; and
send prompt information to a terminal user, the prompt information being used for representing an information security risk that exists in the to-be-intercepted application.

13. A non-transitory computer readable storage medium storing instructions, when the instructions are executed by a processor, the instructions configured to cause the processor to perform:
starting a first application;
obtaining a network request sent by a to-be-intercepted application; and
when the first application enters an interception mode:
monitoring interactions of network requests in X target processes, to capture the network request, X being a natural number greater than 1,
setting hook functions in a first function sendto and a second function recvfrom that are used for representing a request message forwarding node,
generating a first monitoring function hook_sendto and a second monitoring function hook_recvfrom that are used for monitoring interactions of network requests,
using the first monitoring function hook_sendto and the second monitoring function hook_recvfrom as a monitoring detection interface,
obtaining communication information according to the monitoring detection interface,
establishing an association between the first application and the X target processes of each respective to-be-intercepted application in a list of applications, and
making the first application enter the X target processes according to the established association, to monitor the X target processes.

14. The non-transitory computer readable storage medium according to claim 13, wherein, when the instructions are executed by the processor, the instructions are configured to cause the processor to perform:
extracting the list of applications that need to be intercepted; and
configuring an interception policy for the to-be-intercepted application in the list of applications.

15. The non-transitory computer readable storage medium according to claim 14, wherein, when the instructions are executed by the processor and the first application enters the interception mode, the instructions are configured to cause the processor to perform:
matching the communication information with a preset policy, and
when it is determined, through matching, that the communication information is specified target information corresponding to the preset policy:
intercepting the network request, and
locating and tracing the to-be-intercepted application that sends the network request.

16. The non-transitory computer readable storage medium according to claim 15, wherein:
the preset policy comprises specifically a multi-feature audit policy.

17. The non-transitory computer readable storage medium according to claim 14, wherein, wherein, when the instructions are executed by the processor and the first application enters the interception mode, the instructions are configured to cause the processor to perform:
parsing out first information corresponding to the network request and second information corresponding to the to-be-intercepted application that sends the network request;
using the first information and the second information as the communication information;
extracting multiple advertising feature parameters from an advertising cloud list database;
comparing the multiple advertising feature parameters with the communication information according to a multi-feature audit policy;
determining that the communication information is advertising information;
locating the to-be-intercepted application that sends the network request;
intercepting the network request; and
sending prompt information to a terminal user, the prompt information being used for representing an information security risk that exists in the to-be-intercepted application.

18. The non-transitory computer readable storage medium according to claim 14, wherein, wherein, when the instructions are executed by the processor and the first application enters the interception mode, the instructions are configured to cause the processor to perform:
determining, by the device, that the communication information is advertising information;
locating, by the device, the to-be-intercepted application that sends the network request;
intercepting, by the device, the network request; and
sending, by the device, prompt information to a terminal user, the prompt information being used for representing an information security risk that exists in the to-be-intercepted application.

* * * * *